United States Patent
Bradley et al.

(10) Patent No.: US 8,197,013 B2
(45) Date of Patent: Jun. 12, 2012

(54) RAILWAY VEHICLE BRAKE CONTROL SYSTEM

(75) Inventors: Ross Bradley, Melksham (GB); Derek Tate, Melksham (GB); Rodney Miflin, Melksham (GB)

(73) Assignee: Knorr-Bremse Rail Systems (UK) Limited, Melksham, Wiltshire (GB)

( * ) Notice: Subject to any disclaimer, the term of this patent is extended or adjusted under 35 U.S.C. 154(b) by 1242 days.

(21) Appl. No.: 10/556,166

(22) PCT Filed: May 10, 2004

(86) PCT No.: PCT/GB2004/002011
§ 371 (c)(1),
(2), (4) Date: Oct. 26, 2006

(87) PCT Pub. No.: WO2004/098966
PCT Pub. Date: Nov. 18, 2004

(65) Prior Publication Data
US 2007/0205657 A1    Sep. 6, 2007

(30) Foreign Application Priority Data
May 9, 2003 (GB) .................................. 0310704.2

(51) Int. Cl.
*B60T 13/00* (2006.01)

(52) U.S. Cl. .................. 303/8; 303/3; 303/33

(58) Field of Classification Search ................. None
See application file for complete search history.

(56) References Cited

U.S. PATENT DOCUMENTS

| | | | | |
|---|---|---|---|---|
| 5,813,383 | A | * | 9/1998 | Cummings ................. 123/198 F |
| 5,988,773 | A | * | 11/1999 | Sawada .................... 303/122.08 |
| 6,036,284 | A | * | 3/2000 | Pettit et al. .................... 303/15 |
| 6,074,019 | A | * | 6/2000 | Phillips et al. ............. 303/119.1 |
| 6,883,875 | B2 | * | 4/2005 | Tate et al. .................... 303/9.62 |
| 2010/0059015 | A1 | * | 3/2010 | Surnilla ........................ 123/295 |
| 2010/0063706 | A1 | * | 3/2010 | Surnilla ........................ 701/102 |

FOREIGN PATENT DOCUMENTS
GB         2359599 A    *    8/2001

* cited by examiner

*Primary Examiner* — Bradley King
*Assistant Examiner* — Thomas Irvin
(74) *Attorney, Agent, or Firm* — Barnes & Thornburg LLP

(57) ABSTRACT

In a brake system for a railway vehicle, actuation of the respective inlet, (4,6), exhaust (5,7) and a link valve (9) is controlled by an electronic control unit (20). The electronic control unit (20) has a counter for counting the number of valve operations performed by each respective inlet (4,6) and exhaust (5,7) valve, wherein the electronic control unit (20), in use, determines which of the respective inlet (4,6) and exhaust (5,7) valves are to be actuated to brake the railway vehicle. The determination is made at least in part in dependence on the number of valve operations performed by the respective inlet (4,6) and exhaust (5,7) valves.

12 Claims, 1 Drawing Sheet

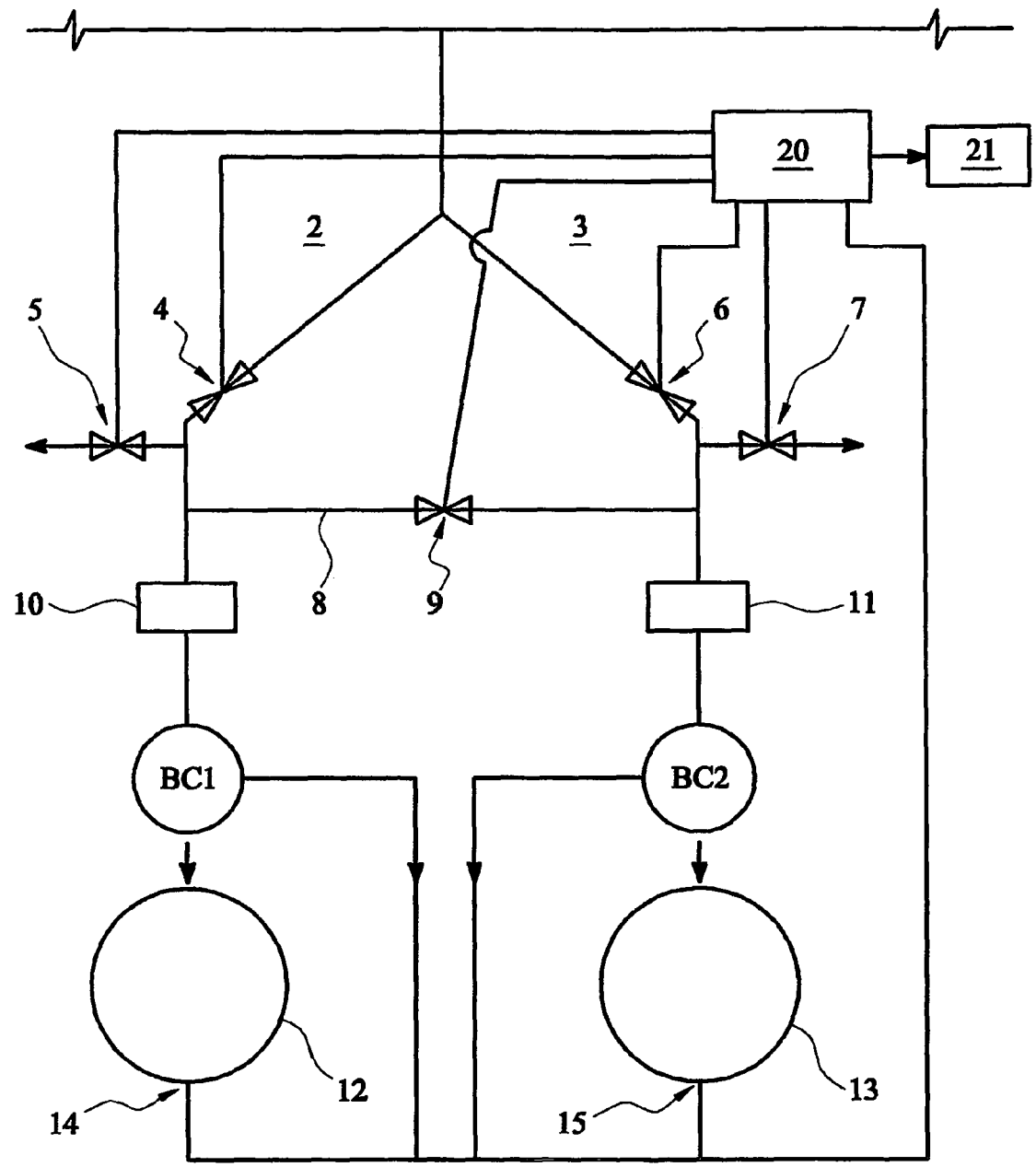

RAILWAY VEHICLE BRAKE CONTROL SYSTEM

The invention relates to a method of controlling a pneumatic brake system in a railway vehicle A typical railway vehicle comprises a number cars or trucks and several trainlines. The trainlines include both pneumatic and electrical lines connected in series which run along the length of the vehicle. One such pneumatic trainline is the main brake pipe. In a conventional arrangement the air pressure in the main brake pipe is used to bias the brake actuators on each bogie of a car in an off position, so that in the event of a pressure drop in the brake pipe due to a failure the brakes are applied.

With normal service braking it is usual for the brake actuator pressure in all the actuators to be the same to ensure uniform braking. However, in some circumstances, such as where there is low wheel to rail adhesion, it is necessary to control the brake pressure on each axle individually to ensure uniform braking. This individual control, known as wheel slide protection (WSP), requires that the brake pressure at each axle be controllable independently of the brake pressure on other axles and/or bogies.

WO 01/062567 describes such a method of and apparatus for controlling brake actuation outputs in particular in relation to a brake for a railway vehicle. In this system, a valve arrangement is provided having first and second brake actuation outputs for first and second brake actuators to control the pressure in the first and second brake actuation outputs. The arrangement comprises first and second air inlet valves for supplying air to respective ones of the actuation outputs, first and second exhaust valves, each associated with a respective inlet valve and a link valve between the actuation outputs. The link valve permits the pressure in each of the actuation outputs to be selectively controlled either jointly when the valve is open or independently when the link valve is closed. The control of the valves is determined by an electronic control unit. The valves in this arrangement are individually controlled so that in the event of a fault at least 50% operability is ensured.

However, brake systems such as that described in WO 01/062567 suffer from the problem that due to the wear on the individual valves, which in general is unequal along the length of vehicle, the brake valves have a limited operational life.

The invention therefore seeks to a provide a brake system with a greater operational life According to the invention there is provided a brake system for use in a railway vehicle comprising an air supply adapted to supply, in use, air via first and second air channels to first and second brake actuators, the pressure of the air supplied to each actuator being controlled by a respective inlet and an exhaust valve, wherein a further valve is provided, which further valve is adapted to control, in use, airflow in an air channel between the respective inlet valves, actuation of the respective inlet, exhaust and the further valve being controlled by an electronic control unit, which electronic control unit has a counter for counting the number of valve operations performed by each respective inlet and exhaust valve, wherein the electronic control unit, in use, determines which of the respective inlet and exhaust valves are to be actuated to brake the railway vehicle, at least in part in dependence on the number of valve operations performed by the respective inlet and exhaust valves.

In a preferred embodiment the electronic control unit determines of which of the inlet and exhaust valves are to be actuated so as to equalise wear on the valves. Preferably, the further valve is maintained in an open position to permit airflow from said first air channel to the second air channel and/or vice versa, such that application of pressure to the first and second brake actuators is controlled by only one of the respective inlet and exhaust valve pairs.

Preferably, the further valve is closed so as to permit separate control of the respective pairs of inlet and exhaust valves. Preferably, the respective pairs of inlet and exhaust valves are controlled in parallel to increase air flow or to compensate for a failed valve. Preferably, the electronic control unit determines which respective inlet and exhaust valves are actuated based on the total number of valve operations of the inlet and exhaust valves. Preferably, the electronic control unit determines which respective inlet and exhaust valves are actuated, and alternates between respective pairs of inlet and exhaust valves after a predefined number of brake operations.

In an alternative embodiment, the electronic control unit may determine which respective inlet and exhaust valves are actuated, and alternates between respective pairs of inlet and exhaust valves after a predetermined time interval.

An exemplary embodiment of the invention will now be described in greater detail with reference to the drawings in which:

FIG. 1 shows a schematic of a brake system

FIG. 1 shows a schematic of a brake system for a two axle bogie railway car comprising an air supply 1 which, in use, supplies air to first and second channels 2, 3. Each channel 2,3 feeds to first and second brake actuators 10,11 and is provided with a respective inlet valve 4,6. Each inlet valve 4,6 is connected to a respective exhaust valve 5,7, which exhaust valve provides a vent to air. A further pneumatic connection 8 is provided between the channels 2 and 3, which pneumatic connection is provided with a link valve 9 adapted to control the flow of air between the channels 2 and 3. Brake actuators 10,11 apply pressure in respective brake cylinders BC1,BC2, which apply the brakes on axles 12,13.

The system is further provided with an electronic control unit 20 adapted to control the operation of the inlet valves 4,6, exhaust valves 5,7 and the link valve 9. Each of said aforementioned valves is provided with a counter, which counter records each operation of the valve. The electronic control unit (ECU) 20 is provided with further inputs from sensors on each axle adapted to detect low wheel to track adhesion (wheel slide). The ECU 20 also monitors the actual brake pressure in each brake cylinder. Each car of the railway vehicle is provided with its own ECU to provide a distributed control system.

In use, due to the high number of operations of the valves, the instantaneous value of the counter is held in a volatile memory such as a RAM. The value of the counter is then stored in a non-volatile memory such as an EEPROM 21, which typically can store up to a million write operations. As the valves will have a typical lifetime of up to 200 million operations, the data is downloaded at regular servicing intervals.

The ECU 20 controls each pair of inlet and exhaust valves independently as separate control groups, comprising inlet valve 4 and exhaust valve 5 comprising inlet valve 6 and exhaust valve 7, respectively. In normal service braking operation, the ECU 20 selects one or other of the control groups or to increase or decrease the pressure in the brake actuators 10,11. The link valve 9 is open during normal operating conditions so that the pressure between the channels 2 and 3 is equalised.

The choice of which one of the control groups is selected is determined by the electronic control unit 20. The selection can be made on several bases such as the total number of lifetime operations of the respective valves 4,5 and 6,7. Alternative bases include switching groups after a predetermined number of valve operations, after every single valve operation of group of valve operations. In practice an acceptable compromise is to switch the groups after every brake stop of the vehicle.

In the event that low wheel to rail adhesion is detected such as when the rotational speed of one axle differs by more than a predetermined amount from the adjacent axles, the ECU 20 is adapted to close the link valve 9 to isolate the axle for which low adhesion has been determined. The ECU 20 can then operate the inlet and exhaust valves for the control group of that axle in accordance with its wheel slide protection programme to restore the desired adhesion to the rail. WSP generally involves a substantially increased number of valve operations in comparison to conventional servicing braking and the counters record this increased number of operations.

The ECU 20 also monitors the actual brake pressure in each brake cylinder and compares the actual brake pressure with predetermined characteristic or target values. In the event that the difference between the actual brake pressure and the target value exceeds a predetermined value, the ECU 20 will operate both control groups in parallel to improve the response. This is particularly useful in the event that either one of the inlet or exhaust valves fails to open as the operation of the brakes on the bogie can then be controlled by the remaining control group via the other channel. In the event that such a fault is detected the ECU will also log the fault.

The invention claimed is:

1. A brake system for use in a railway vehicle comprising an air supply adapted to supply, in use, air via first and second air channels to first and second brake actuators, the pressure of the air supplied to each actuator being controlled by a respective inlet and an exhaust valve,
   wherein a further valve is provided, which further valve is adapted to control, in use, airflow in an air channel between the respective inlet valves,
   actuating of the respective inlet, exhaust, and the further valve being controlled by an electronic control unit, which electronic control unit has a counter for counting the number of valve operations performed by each respective inlet and exhaust valve,
   wherein the electronic control unit, in use, determines which of the respective inlet and exhaust valves are to be actuated to brake the railway vehicle, at least in part in dependence on the number of valve operations performed by the respective inlet and exhaust valves,
   wherein each respective inlet valve and exhaust valve constitute a control group,
   wherein, the electronic control unit operates the inlet and exhaust valves of a control group of a respective axle based on adhesion to the rail, and
   wherein, the electronic control unit switches between control groups after a predetermined plurality of valve operations.

2. A brake system according to claim 1, wherein, in use, the further valve is maintained in an open position to permit airflow between the first air channel and the second air channel, such that application of pressure to the first and second brake actuators is controlled by only one of the respective inlet and exhaust valve pairs.

3. A brake system according to claim 1, wherein, in use, the further valve is closed so as to permit separate control of the respective pairs of inlet and exhaust valves.

4. A brake system according to claim 1, wherein, in use, the respective pairs of inlet and exhaust valves are controlled in parallel.

5. A brake system according to claim 1, wherein the electronic control unit selects which inlet and exhaust valves are to be actuated so as to equalize wear on the valves.

6. A brake system according to claim 1, wherein, when low wheel to rail adhesion is detected by the electronic control unit, the electronic control unit closes the further valve to isolate an axle for which low adhesion has been detected.

7. A brake system for use in a railway vehicle comprising an air supply adapted to supply, in use, air via first and second air channels to first and second brake actuators, the pressure of the air supplied to each actuator being controlled by a respective inlet and an exhaust valve,
   wherein a further valve is provided, which further valve is adapted to control, in use, airflow in an air channel between the respective inlet valves,
   actuating of the respective inlet, exhaust, and the further valve being controlled by an electronic control unit, which electronic control unit has a counter for counting the number of valve operations performed by each respective inlet and exhaust valve,
   wherein the electronic control unit, in use, determines which of the respective inlet and exhaust valves are to be actuated to brake the railway vehicle, at least in part in dependence on the number of valve operations performed by the respective inlet and exhaust valves,
   wherein each respective inlet valve and exhaust valve constitute a control group,
   wherein, the electronic control unit operates the inlet and exhaust valves for a control group of a respective axle based on adhesion to the rail, and
   wherein, the electronic control unit switches between control groups after every brake stop of the vehicle.

8. A brake system according to claim 7, wherein, in use, the further valve is maintained in an open position to permit airflow between the first air channel and the second air channel, such that application of pressure to the first and second brake actuators is controlled by only one of the respective inlet and exhaust valve pairs.

9. A brake system according to claim 7, wherein, in use, the further valve is closed so as to permit separate control of the respective pairs of inlet and exhaust valves.

10. A brake system according to claim 7, wherein, in use, the respective pairs of inlet and exhaust valves are controlled in parallel.

11. A brake system according to claim 1, wherein the electronic control unit selects which inlet and exhaust valves are to be actuated so as to equalize wear on the valves.

12. A brake system according to claim 7, wherein, when low wheel to rail adhesion is detected by the electronic control unit, the electronic control unit closes the further valve to isolate an axle for which low adhesion has been detected.

* * * * *